US012266469B2

United States Patent
Biaujaud (10) Patent No.: US 12,266,469 B2
(45) Date of Patent: Apr. 1, 2025

(54) AUTOTRANSFORMER, AUTOTRANSFORMER-RECTIFIER UNIT AND METHOD FOR CONNECTING A PIECE OF ELECTRICAL EQUIPMENT TO A THREE-PHASE GRID BY MEANS OF AN AUTOTRANSFORMER-RECTIFIER UNIT

(71) Applicant: SAFRAN, Paris (FR)

(72) Inventor: Rémy Biaujaud, Moissy-cramayel (FR)

(73) Assignee: SAFRAN, Paris (FR)

( * ) Notice: Subject to any disclaimer, the term of this patent is extended or adjusted under 35 U.S.C. 154(b) by 142 days.

(21) Appl. No.: 17/998,282

(22) PCT Filed: May 12, 2021

(86) PCT No.: PCT/FR2021/050837
§ 371 (c)(1),
(2) Date: Nov. 9, 2022

(87) PCT Pub. No.: WO2021/229190
PCT Pub. Date: Nov. 18, 2021

(65) Prior Publication Data
US 2023/0274877 A1    Aug. 31, 2023

(30) Foreign Application Priority Data

May 15, 2020 (FR) ...................................... 2004854

(51) Int. Cl.
H01F 30/02 (2006.01)
H01F 30/12 (2006.01)
H02M 5/14 (2006.01)

(52) U.S. Cl.
CPC ............. *H01F 30/02* (2013.01); *H01F 30/12* (2013.01); *H02M 5/14* (2013.01)

(58) Field of Classification Search
CPC ........... H01F 30/02; H01F 30/12; H02M 5/14
See application file for complete search history.

(56) References Cited

U.S. PATENT DOCUMENTS 5,148,357 A * 9/1992 Paice ...................... H01F 30/12
363/5
6,198,647 B1 * 3/2001 Zhou ...................... H01F 30/14
363/154

(Continued)

FOREIGN PATENT DOCUMENTS

FR          3069697 A1     2/2019

OTHER PUBLICATIONS

International Search Report for issued in Application No. PCT/FR2021/050837 dated Aug. 17, 2021.

(Continued)

*Primary Examiner* — Rafael O De Leon Domenech
(74) *Attorney, Agent, or Firm* — McDonald Hopkins LLC (57) ABSTRACT

A three-phase autotransformer including three output groups and three inputs each connected to each of the outputs of a respective output group by windings, the windings being configured so that, when each input has a respective input voltage applied thereto, the three input voltages having the same input amplitude, being 120° out of phase with each other and defining a neutral point: for each output group, a main output voltage, taken between a main output of said output group and the neutral point, has an amplitude greater than the input amplitude; and output voltages of the autotransformer belong to a same Reuleaux polygon, each output voltage being associated with a respective output and being equal to a voltage between said output and the neutral point.

10 Claims, 5 Drawing Sheets

(56) References Cited

U.S. PATENT DOCUMENTS

| | | | | |
|---|---|---|---|---|
| 6,335,872 | B1* | 1/2002 | Zhou | H02M 5/14 |
| | | | | 363/148 |
| 7,274,280 | B1* | 9/2007 | Paice | H02M 5/14 |
| | | | | 363/148 |
| 7,719,858 | B1 | 5/2010 | Paice | |
| 2011/0216564 | A1* | 9/2011 | Swamy | H02M 1/4216 |
| | | | | 363/126 |
| 2013/0128634 | A1* | 5/2013 | Ganev | H02M 1/12 |
| | | | | 363/64 |
| 2013/0170257 | A1* | 7/2013 | Ganev | H01F 30/02 |
| | | | | 363/64 |
| 2014/0265955 | A1* | 9/2014 | Garlow | H02M 1/12 |
| | | | | 363/67 |
| 2014/0313800 | A1* | 10/2014 | Swamy | H02M 7/08 |
| | | | | 363/126 |
| 2016/0209459 | A1* | 7/2016 | Tozzi | G01R 31/14 |
| 2016/0276099 | A1* | 9/2016 | Huang | H01F 30/12 |
| 2019/0035545 | A1* | 1/2019 | Mairie | H01F 30/02 |

OTHER PUBLICATIONS

Written Opinion for PCT/FR2021/050837 dated Aug. 17, 2021.
Search Report issued in French Patent Application No. 2004854 dated Jan. 27, 2021.

* cited by examiner

AUTOTRANSFORMER, AUTOTRANSFORMER-RECTIFIER UNIT AND METHOD FOR CONNECTING A PIECE OF ELECTRICAL EQUIPMENT TO A THREE-PHASE GRID BY MEANS OF AN AUTOTRANSFORMER-RECTIFIER UNIT

This is the National Stage of PCT international application PCT/FR2021/050837, filed on May 12, 2021 entitled "AUTOTRANSFORMER, AUTOTRANSFORMER-RECTIFIER UNIT AND METHOD FOR CONNECTING A PIECE OF ELECTRICAL EQUIPMENT TO A THREE-PHASE GRID BY MEANS OF AN AUTOTRANSFORMER-RECTIFIER UNIT", which claims the priority of French Patent Application No. 2004854 filed May 15, 2020, both of which are incorporated herein by reference in their entireties.

TECHNICAL FIELD

The present invention relates to a three-phase autotransformer including three inputs, three output groups and a plurality of windings distributed into three winding groups, the windings of a same winding group being magnetically coupled to each other, each winding group being associated with a respective phase.

The invention also relates to an autotransformer-rectifier unit, and a method for connecting an electrical piece of equipment to a three-phase grid by means of such an autotransformer.

The invention applies to the field of electrotechnics, in particular to the supply of electrical power to on-board electrical devices, in particular on board an aircraft.

STATE OF PRIOR ART

Conventionally, an on-board electrical grid for an aircraft is a three-phase grid capable of delivering single voltages with an amplitude of 115 V (volt).

In the following, the term "single voltage" will refer to a voltage between a given point (for example, a terminal of a circuit, or even a phase of the three-phase grid) and a predefined neutral point used as a potential reference, in particular a connection point for the three phases of the three-phase grid.

For the supply of electrical energy to on-board electrical pieces of equipment requiring a DC voltage (typically close to 540 V) for the operation thereof, an AC/DC converter whose outputs define a DC voltage bus is placed between said electrical pieces of equipment and the on-board grid. Such electrical pieces of equipment are, for example, engine control converters.

Conventionally, such an AC/DC converter is a conventionally known so-called "18-pulse rectifier" converter. Such a converter has the advantage of being of low overall size and inexpensive.

Within this context, an autotransformer is arranged between the three-phase grid and the rectifier in order to supply, from the three phases of the three-phase grid, nine input voltages to the 18-pulse rectifier. Such a combination of a rectifier and an autotransformer arranged at its input is generally referred to as an "autotransformer-rectifier unit", or ATRU.

However, such an ATRU is not entirely satisfactory in all cases.

Indeed, in cases, for example, where it is desired to add an electrical function (that is, an electrical load) to an already existing on-board grid, and where the new function consumes a significant amount of power with respect to that delivered by the generator associated with said grid, the customer may require that the distortion rate absorbed by the new function be lower than traditional aeronautical standards (for example, DO160 Sect. 16) to reach a level of, for example, less than 1%. Such performance is not generally achieved by an ATRU comprising an 18-pulse converter.

It is therefore a purpose of the invention to provide an ATRU allowing the connection, to a 115 V AC grid, of an electrical piece of equipment such as those previously described, which is of low overall size, inexpensive, has a satisfactory energy efficiency and provides, as an output, a direct current with a low harmonic distortion rate.

DISCLOSURE OF THE INVENTION

To this end, one object of the invention is an autotransformer of the above-mentioned type, in which each output group comprises five outputs including a main output and four auxiliary outputs, each input being associated with each of the outputs of a corresponding output group, each input being connected to each of the corresponding outputs through a respective electrical path comprising at least one winding, and for each input, the electrical path between said input and a corresponding output on the one hand, and the electrical path between the input and any other output of the same output group on the other hand, comprise at least one distinct winding, the windings being configured so that, when each input has a respective input voltage applied thereto, the three input voltages having the same input amplitude, being 120° out of phase with each other and defining a neutral point:

for each output group, a main output voltage, taken equal to a voltage between the corresponding main output and the neutral point, has an amplitude, forming a main output amplitude, greater than the input amplitude; and all output voltages of the autotransformer belong to a same Reuleaux polygon in a Fresnel diagram, each output voltage being associated with a respective output and being equal to a voltage between said output and the neutral point.

Indeed, such an autotransformer has a low overall size, due to a small number of coils. The latter point also results in a low manufacturing cost. Furthermore, the presence of 15 output phases leads, after the use of a rectifier, to a DC voltage having a harmonic distortion rate compatible with the requirements set out previously.

According to other advantageous aspects of the invention, the autotransformer includes one or more of the following characteristics, taken in isolation or according to any technically possible combination:

the windings are configured such that, when each input has a respective input voltage applied thereto, the three input voltages having the same input amplitude, being 120° out of phase with each other and defining a neutral point:

the three main output voltages are 120° out of phase with each other; and for a given distinct first main output and second main output of the main outputs, and for each of the auxiliary outputs for which a corresponding auxiliary voltage, equal to the voltage between said auxiliary output and the neutral point, has a phase between the phase of the main output voltage of the first main output and the phase of the main output voltage of the second main output, the voltages between said outputs and a predetermined point have the same amplitude;

the predetermined point is a third main output distinct from the first main output and the second main output;

the predetermined point is the neutral point;

the voltages between each output and the neutral point are distinct and two by two out of phase with each other by an integer multiple of 24°;

each main output amplitude is equal to the product of the input amplitude by a predetermined coefficient between 1.85 and 2, preferably between 1.9 and 1.95, for example equal to 1.93;

for the first main output, the second main output, and each of the auxiliary outputs for which the corresponding auxiliary voltage has a phase between the phase of the main output voltage of the first main output and the phase of the main output voltage of the second main output, the voltages between said outputs and the third main output are distinct and two by two out of phase with each other by an integer multiple of 12°;

the electrical path between an input and any output of the corresponding output group includes at least two windings each belonging to different winding groups.

Another object of the invention is an autotransformer-rectifier unit comprising an autotransformer as defined above and a rectifier stage, the rectifier stage comprising fifteen inputs and two outputs, each input of the rectifier stage being connected to a respective output of the autotransformer.

Furthermore, one object of the invention is a method for connecting an electrical piece of equipment to a three-phase grid by means of an autotransformer-rectifier unit as defined above, the electrical piece of equipment being dimensioned to have, as an input, a predetermined nominal voltage, the three-phase grid delivering three voltages each having a corresponding input amplitude, the method including the steps of:

connecting each input of the autotransformer to a corresponding phase of the three-phase grid; and connecting the electrical piece of equipment between the two outputs of the rectifier stage, the predetermined nominal voltage being equal to $6\sqrt{6}/\pi$ times the input voltage.

BRIEF DESCRIPTION OF THE DRAWINGS

The invention will be better understood using the following description, given only as a non-limiting example and made with reference to the attached drawings in which.

DESCRIPTION OF THE EMBODIMENTS

Figure 1:
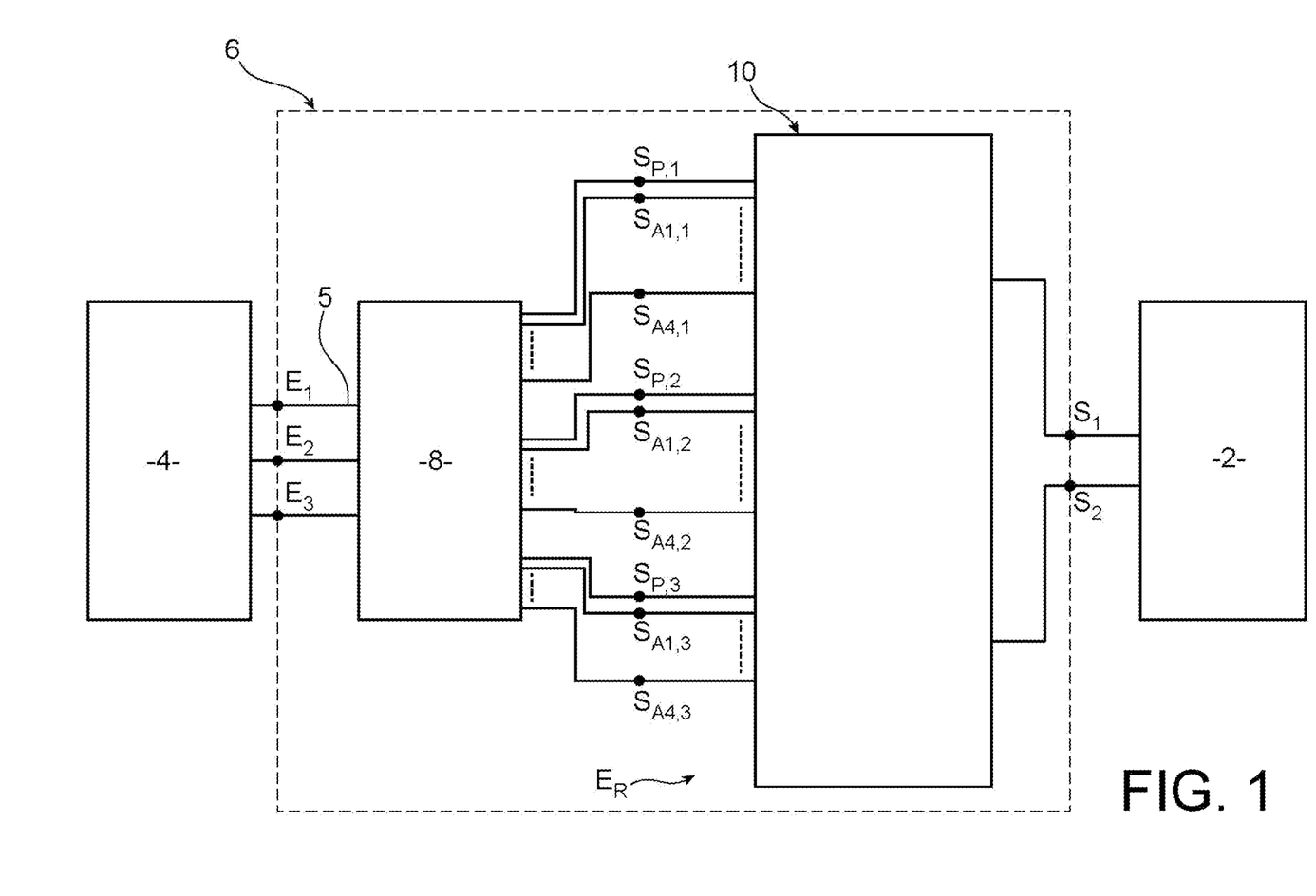
FIG. 1 is a schematic representation of an electrical piece of equipment connected to an electrical grid by means of an ATRU according to the invention.

In FIG. 1 an electrical piece of equipment 2 connected to an electrical grid 4 by means of an autotransformer-rectifier unit 6 according to the invention, called "ATRU" is represented.

The electrical piece of equipment 2 is a piece of equipment configured to be supplied with a DC voltage having a predetermined nominal value, for example 540 V.

The electrical piece of equipment 2 is connected to the outputs $S_1$, $S_2$ of the ATRU 6.

The electrical grid 4 is a three-phase grid, for example a 115 V AC grid. Typically, the electrical grid 4 includes three phases 5, each of which is capable of delivering a respective voltage. Preferably, the electrical grid 4 is a so-called "balanced" grid, the three voltages supplied by the electrical grid 4 having the same so-called "input amplitude", and being 120° out of phase with each other.

The three voltages supplied by the electrical grid 4 define a neutral point, preferably corresponding to a connection point of the three phases 5. The neutral point is denoted as A in FIGS. 2 and 4, in which it defines a potential reference.

Each phase 5 of the electrical grid 4 is connected to a respective input $E_1$, $E_2$, $E_3$ of the ATRU 6.

The ATRU 6 is configured to convey electrical power from the electrical grid 4 to the electrical piece of equipment 2. More precisely, the ATRU 6 is configured to deliver a DC voltage between its two outputs $S_1$, $S_2$ when the electrical grid 4 applies an AC voltage to each of the inputs $E_1$, $E_2$, $E_3$ of the ATRU 6.

The ATRU 6 comprises an autotransformer 8 and a rectifier stage 10.

The autotransformer 8 comprises three inputs $E_1$, $E_2$, $E_3$ forming the inputs $E_1$, $E_2$, $E_3$ of the ATRU 6. Furthermore, the autotransformer 8 includes fifteen outputs.

The autotransformer 8 is configured to deliver, from the voltages coming from the three-phase grid 4 and applied to each of its inputs $E_1$, $E_2$, $E_3$, fifteen AC voltages, each of which is available at a respective output of the fifteen outputs of the autotransformer 8.

The outputs of the autotransformer 8 are distributed into three output groups, each comprising five outputs. More precisely, each output group comprises one main output, denoted as $S_P$, and four auxiliary outputs, denoted as $S_{A1}$ to $S_{A4}$.

Each input $E_1$, $E_2$, $E_3$ of the autotransformer 8 is associated with a corresponding output group, in particular with each of the five outputs of the corresponding output group.

The rectifier stage 10 is a known 30-pulse rectifier (also called "30-pulse bridge"), preferably an uncontrolled 30-pulse rectifier.

The rectifier stage 10 comprises fifteen inputs $E_R$, each connected to a respective output of the autotransformer 8. Furthermore, the rectifier stage 10 includes two outputs $S_1$, $S_2$ forming the outputs $S_1$, $S_2$ of the ATRU 6.

The rectifier stage 10 is configured to deliver a DC voltage between its outputs $S_1$, $S_2$, from the voltages respectively applied to each of its inputs $E_R$ by the corresponding outputs of the autotransformer 8.

Preferably, for each output of the autotransformer 8, the rectifier stage comprises a corresponding arm, each arm being connected between the output $S_1$ and the output $S_2$ of the ATRU 6.

Each arm comprises a first diode 16A and a second diode 16B. More precisely, the first diode 16A is connected by its cathode to the output $S_1$, and the second diode 16B is connected by its anode to the output $S_2$. Furthermore, the cathode of the second diode 16B and the anode of the first diode 16A are connected to each other at a midpoint. As a result, the rectifier stage 10 forms a full-wave rectifier.

In this case, each output of the autotransformer 8 is connected to the midpoint of the corresponding arm.

The autotransformer 8 will now be described in more detail, in particular with reference to FIG. 2.

The autotransformer 8 comprises a plurality of windings, distributed into three winding groups. The windings of a same winding group are magnetically coupled to each other, for example by means of a magnetic core around which the windings of a same winding group are coiled.

Each winding group is associated with a phase of the electrical grid 4, to which, in operation, one winding of the winding group is connected.

For each winding group a positive direction is defined, corresponding to the direction of the magnetic field generating the magnetic flux that passes through the windings of said winding group when the time derivative of said magnetic flux is negative. In this case, for each winding group:

windings which have a voltage oriented in the positive direction are said to be "oriented in the positive direction"; and
windings which have a voltage oriented in the opposite direction to the positive direction are said to be "oriented in the negative direction".

The windings are arranged so that, when the autotransformer 8 is connected to the electrical grid 4, for any given winding group, voltages across the windings oriented in the positive direction are in phase, and opposite in phase with voltages across the windings oriented in the negative direction.

Furthermore, the windings are configured such that, for any given winding group, voltages across the corresponding windings that are oriented in the positive, respectively negative, direction are 120° out of phase with voltages across the windings oriented in the positive, respectively negative, direction of each of the other two winding groups.

Figure 2:
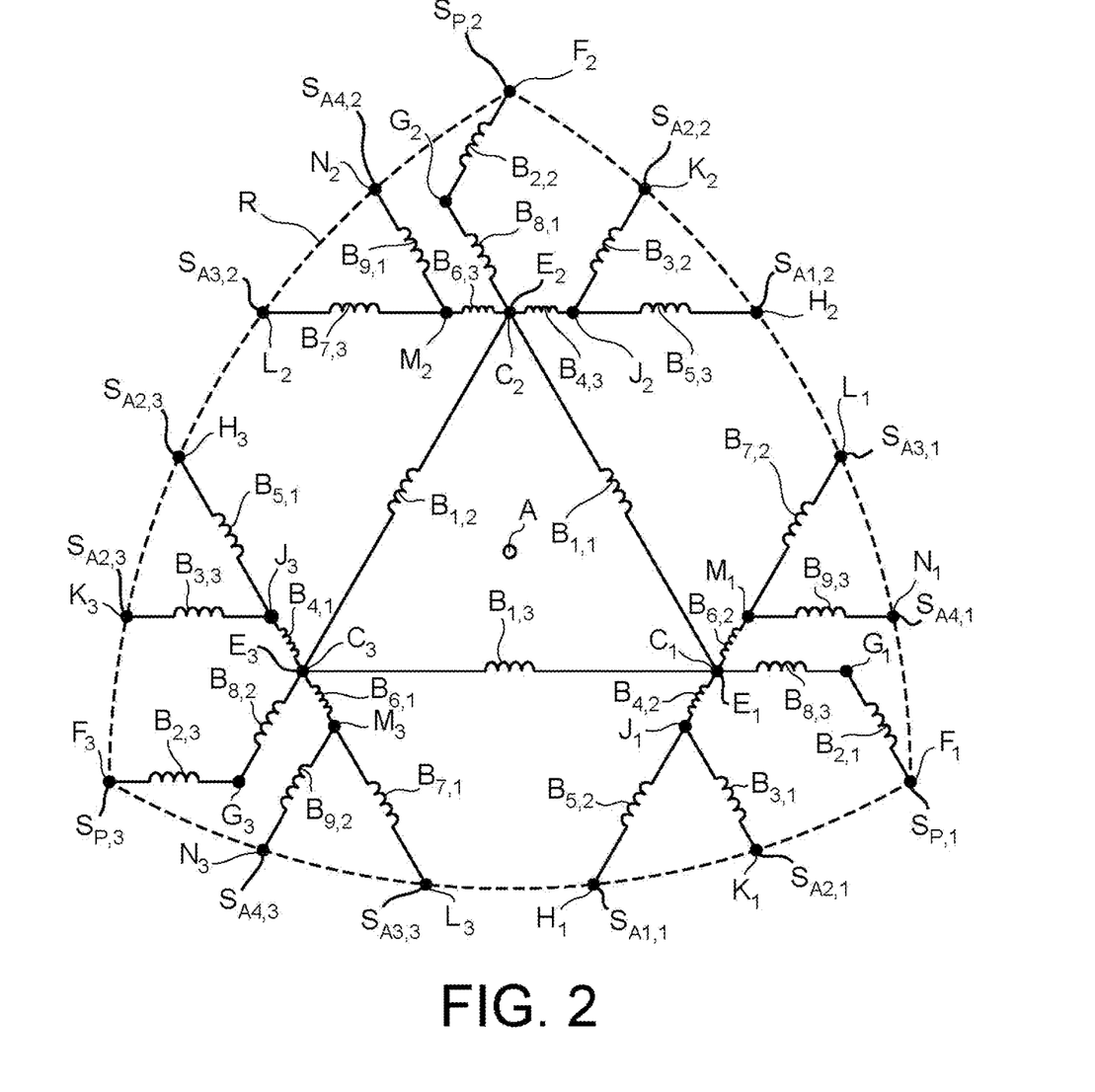
FIG. 2 is a Fresnel diagram illustrating voltages involved in a first embodiment of an autotransformer of the ATRU of FIG. 1.

As is apparent from FIG. 2, each input $E_1$, $E_2$, $E_3$ of the autotransformer 8 is connected to each of the outputs of the corresponding output group through a respective electrical path comprising at least one winding.

Furthermore, for each input $E_1$, $E_2$, $E_3$, the electrical path between said input $E_1$, $E_2$, $E_3$ and a corresponding output on the one hand, and the electrical path between said input $E_1$, $E_2$, $E_3$ and any other output of the same output group on the other hand, comprise at least one distinct winding.

The electrical paths are such that, when the autotransformer 8 is connected to the electrical source 4:

for each output group, a main output voltage, taken equal to a voltage between the corresponding main output $S_P$ and the neutral point A, has a so-called "main output amplitude", greater than the input amplitude; and
the output voltages of the autotransformer belong to a same Reuleaux polygon, each output voltage being associated with a respective output and being equal to a voltage between said output and the neutral point.

As will become apparent from the following description, such a Reuleaux polygon is, for example, a Reuleaux triangle or even a circle.

Advantageously, electrical paths are also configured so that, when the autotransformer 8 is connected to the electrical source 4:

the three main output voltages are 120° out of phase with each other; and
for a given distinct first main output and second main output of the main outputs $S_P$, and for each of the auxiliary outputs $S_A$ for which a corresponding auxiliary voltage, equal to the voltage between said auxiliary output $S_A$ and the neutral point A, has a phase between the phase of the main output voltage of the first main output and the phase of the main output voltage of the second main output, the voltages between said outputs and a predetermined point have the same amplitude.

Furthermore, the three main output voltages are preferably in phase with the single voltages of the electrical grid 4.

Advantageously, the predetermined point is a third main output distinct from the first main output and the second main output. This corresponds to the embodiment of FIG. 2.

In this case, and as is apparent from this figure, the voltage between each output and the neutral point A belongs, on the Fresnel diagram, to a Reuleaux triangle R whose vertices are the main output voltages. This leads to an effect that results in a particularly advantageous compromise between the power transmitted by the autotransformer 8 and its mass.

Advantageously, for the first main output, the second main output, and each of the auxiliary outputs for which the corresponding auxiliary output voltage has a phase between the phase of the main output voltage of the first main output and the phase of the main output voltage of the second main output, the voltages between said outputs and the third main output are distinct and two by two out of phase with each other by an integer multiple of 12°.

Preferably, each main output amplitude is equal to the product of the input amplitude by a predetermined coefficient between 1.85 and 2, preferably between 1.9 and 1.95, for example equal to 1.93. As a result, the autotransformer 8 is a step-up transformer.

Such a value of the predetermined coefficient, in particular 1.93, is advantageous in that it leads to a satisfactory compactness of the autotransformer 8 as well as to a simplified construction by reducing the number of coils necessary to obtain the 15 phases, while allowing the ATRU 6 to supply a DC voltage close to 540 V when it is connected to a three-phase grid with an input amplitude equal to 115 V (approximately 520 V for a predetermined coefficient equal to 1.93).

Furthermore, the fact that the voltage supplied is equal to 520V is not detrimental in itself, insofar as the ATRU 6 is generally connected at the output to an inverter. Therefore, the inverter only needs to be dimensioned for this voltage level (this implies an increase in current requirement and a reduction in voltage requirement), the difference between 520 V and 540 V is small enough for the impact on the inverter to be negligible. If the ATRU 6 were to supply a distributed grid, this could be detrimental as it would have to meet the grid standard.

A preferred implementation of the autotransformer 8 is illustrated in FIG. 2.

In the following, i is 1, 2 or 3. Furthermore:

if i is taken equal to 1, then i−1 is taken equal to 3; and
if i is taken equal to 3, then i+1 is taken equal to 1.

The autotransformer 8 comprises three connection points $C_1$, $C_2$ and $C_3$. Precisely, the input $E_i$ (i taking all values from 1 to 3) of the autotransformer 8 is connected to the connection point $C_i$.

The winding group i (i being 1, 2 or 3) includes, between the connection point $C_i$ and the connection point $C_{i+1}$, a winding $B_{1,i}$. In this way, the windings $B_{1,i}$ are delta-connected.

Preferably, the windings $B_{1,i}$ are identical.

The main output of the output group i, denoted as $S_{P,i}$, is connected to a first terminal, denoted as $F_i$, of a winding $B_{2,i}$ of the winding group i. The other terminal of the winding $B_{2,i}$ is connected to a corresponding terminal of a winding $B_{8,i-1}$ of the winding group i−1, for example the same as it at a terminal denoted as $G_i$.

The other terminal of the winding $B_{8,i-1}$ is connected to the connection point $C_i$, for example the same as the connection point $C_i$.

The winding $B_{2,i}$ is oriented in the negative direction associated with the winding group i. Furthermore, the winding $B_{8,i-1}$ is oriented in the positive direction associated with the winding group i−1.

A first auxiliary output of the output group i, denoted as $S_{A1,i}$, is connected to a first terminal, denoted as $H_i$, of a winding $B_{5,i+1}$ of the winding group i+1. The other terminal of the winding $B_{5,i+1}$ is connected to a corresponding terminal of a winding $B_{4,i+1}$ of the same winding group i+1, for example the same as it at a terminal denoted as $J_i$.

The other terminal of the winding $B_{4,i+1}$ is connected to the connection point $C_i$, for example the same as the connection point $C_i$.

The windings $B_{4,i+1}$, $B_{5,i+1}$ are both oriented in the positive direction associated with the winding group i+1.

A second auxiliary output of the output group i, denoted as $S_{A2,i}$, is connected to a first terminal, denoted as $K_i$, of a winding $B_{3,i}$ of the winding group i. The other terminal of the winding $B_{3,i}$ is connected to terminal $J_i$ of the winding $B_{4,i+1}$ of the winding group i+1, for example the same as the terminal $J_i$.

The winding $B_{3,i}$ is oriented in the negative direction associated with the winding group i.

A third auxiliary output of the output group i, denoted as $S_{A3,i}$, is connected to a first terminal, denoted as $L_i$, of a winding $B_{7,i+1}$ of the winding group i+1. The other terminal of the winding $B_{7,i+1}$ is connected to a corresponding terminal of a winding $B_{6,i+1}$ of the same winding group i+1, for example the same as it at a terminal denoted as $M_i$.

The other terminal of the winding $B_{6,i+1}$ is connected to the connection point $C_i$, for example the same as the connection point $C_i$.

The windings $B_{6,i+1}$, $B_{7,i+1}$ are both oriented in the negative direction associated with the winding group i+1.

A fourth auxiliary output of output group i, denoted as $S_{A4,i}$, is connected to a first terminal, denoted as $N_i$, of a winding $B_{9,i-1}$ of winding group i−1. The other terminal of the winding $B_{9,i-1}$ is connected to the terminal $M_i$ of the winding $B_{6,i+1}$ of the winding group i+1, for example, the same as the terminal $M_i$.

The winding $B_{9,i-1}$ is oriented in the positive direction associated with the winding group i−1.

Preferably, the windings $B_{5,i+1}$ and $B_{7,i+1}$, respectively the windings $B_{4,i+1}$ and $B_{6,i+1}$, are identical, so that in operation the voltage across them is the same in absolute value.

Preferably, the windings $B_{3,i}$ and $B_{9,i-1}$ are identical, so that in operation the voltage across them is the same in absolute value.

Even more preferably, the windings $B_{2,i}$ and $B_{8,i-1}$ are identical, so that in operation the voltage across them is the same in absolute value.

As indicated previously, the windings are chosen so that the voltage between each output and the neutral point A belongs, on the Fresnel diagram, to the Reuleaux triangle R whose vertices are the main output voltages.

In particular, the voltage between each of the auxiliary outputs $S_{A4,i}$, $S_{A3,i}$, $S_{A1,i+1}$ and $S_{A2,i+1}$ and the neutral point A are on a same arc of the Reuleaux triangle R, said arc being between the main output voltages respectively associated with each of the main outputs $S_{P,i}$ and $S_{P,i+1}$. In other words, the voltages between, on the one hand, each of the auxiliary outputs $S_{A4,i}$, $S_{A3,i}$, $S_{A1,i+1}$ and $S_{A2,i+1}$ and the main outputs $S_{P,i}$, $S_{P,i+1}$ and, on the other hand, the main output $S_{P,i-1}$, are of the same amplitude.

Furthermore:
- the compound voltage between the auxiliary output $S_{A4,i}$ and the main output $S_{P,i-1}$ has a phase lead of 12° over the compound voltage between the main output $S_{P,i}$ and the main output $S_{P,i-1}$;
- the compound voltage between the auxiliary output $S_{A3,i}$ and the main output $S_{P,i-1}$ has a phase lead of 12° over the compound voltage between the auxiliary output $S_{A4,i}$ and the main output $S_{P,i-1}$;
- the compound voltage between the auxiliary output $S_{A1,i+1}$ and the main output $S_{P,i-1}$ has a phase lead of 12° over the compound voltage between the auxiliary output $S_{A3,i}$ and the main output $S_{P,i-1}$;
- the compound voltage between the auxiliary output $S_{A2,i+1}$ and the main output $S_{P,i-1}$ has a phase lead of 12° over the compound voltage between the auxiliary output $S_{A1,i+1}$ and the main output $S_{P,i-1}$; and
- the compound voltage between the main output $S_{P,i+1}$ and the main output $S_{P,i-1}$ has a phase lead of 12° over the compound voltage between the auxiliary output $S_{A2,i+1}$ and the main output $S_{P,i-1}$.

In other words, the voltages between each of the outputs $S_{P,i}$, $S_{P,i+1}$, $S_{A4,i}$, $S_{A3,i}$, $S_{A1,i+1}$ and $S_{A2,i+1}$ and the main output $S_{P,i-1}$ are distinct and two by two out of phase with each other by an integer multiple of 12°, in particular between 0° and 60°.

The phase and amplitude relationships previously described are guaranteed by a judicious choice of the windings 12 forming each electrical path, in particular by a judicious choice of the relative number of turns between the windings 12.

An autotransformer 8 having an architecture such as that illustrated in FIG. 2 is advantageous, in that such an architecture leads to a ratio of the power input to the power output to the electrical piece of equipment 2 (forming a load) which is lower than that obtained for other architectures. This results in a small overall size and low mass, as well as reduced winding lengths with respect to other architectures, with consequently a lower production cost than for other autotransformer architectures.

Figure 3:
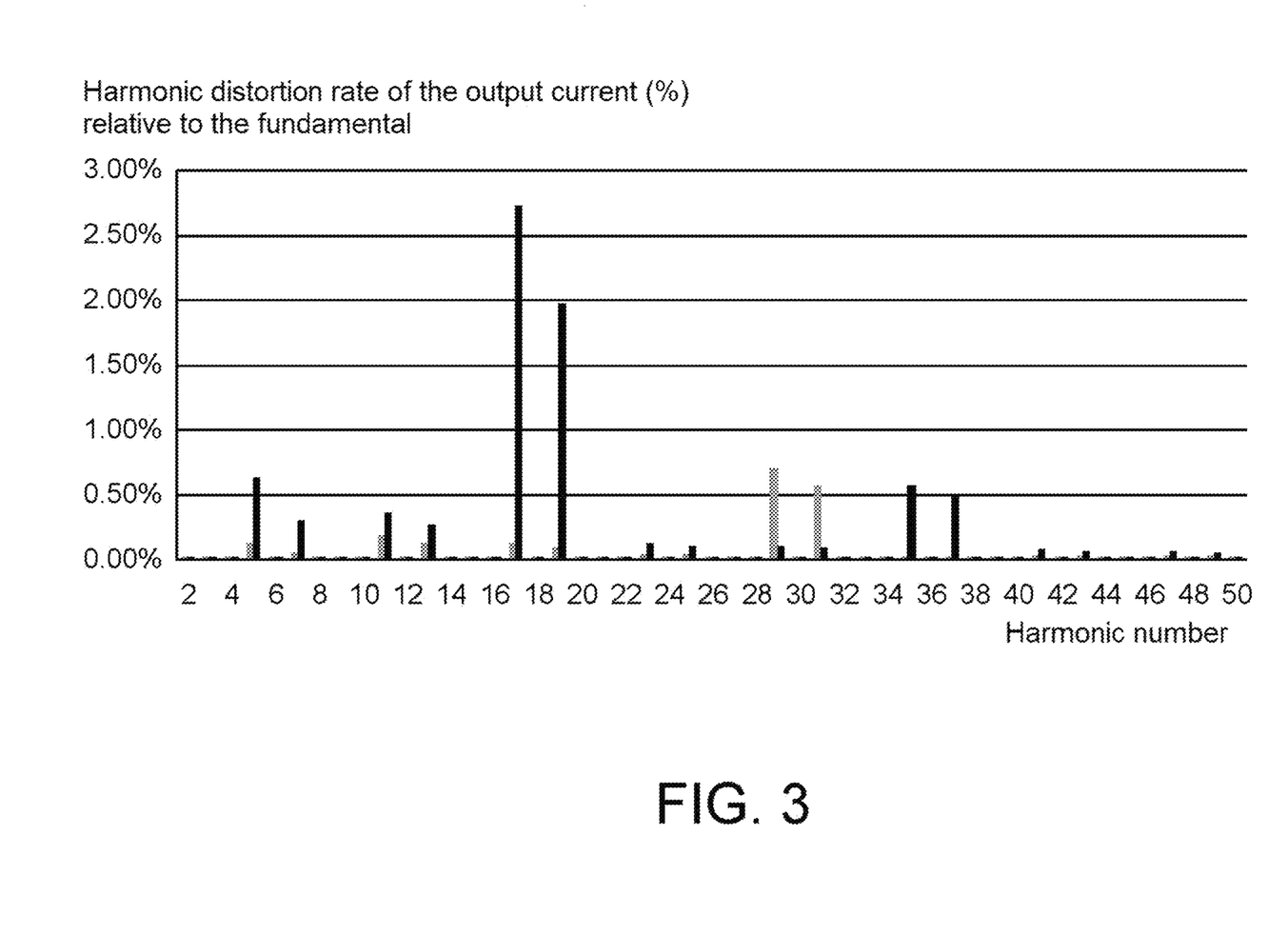
FIG. 3 is a graph representing, as a function of the harmonic number, the harmonic distortion rate of the current delivered by the ATRU of FIG. 1, compared to the current delivered by an ATRU of the state of the art which includes an 18-pulse rectifier.

Furthermore, as is apparent from FIG. 3, the harmonic distortion rate (grey bars) of the current delivered by the ATRU 6 according to the invention is much better than the harmonic distortion rate (black bars) of the current delivered by an ATRU with an autotransformer providing nine outputs, coupled to an 18-pulse rectifier.

The total harmonic distortion rate of the current delivered by the ATRU 6 according to the invention is about 0.95%, while that of an ATRU with an autotransformer providing nine outputs, coupled to a pulse rectifier is about 3.54%.

Figure 4:
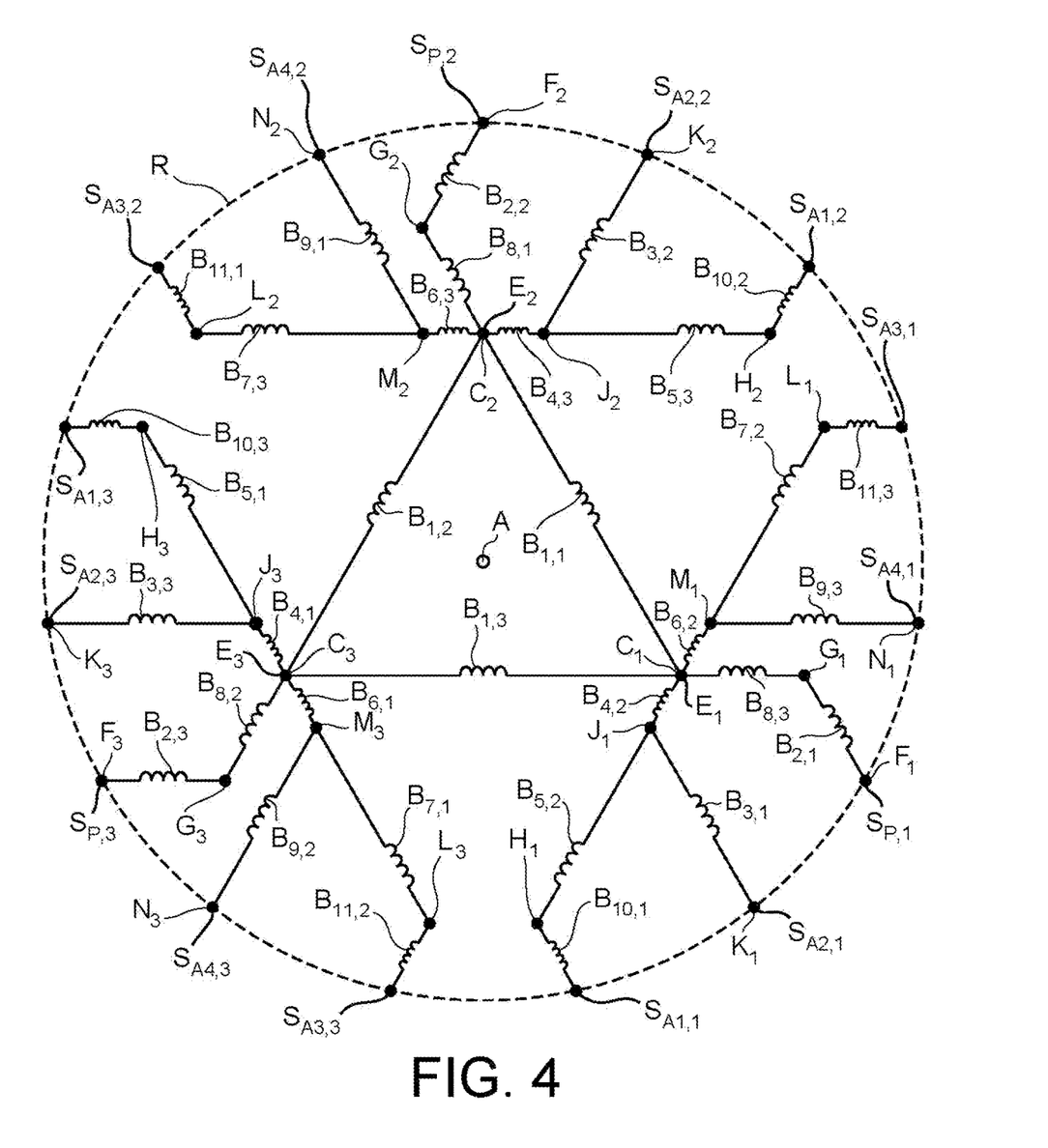
FIG. 4 is a Fresnel diagram illustrating voltages involved in a second embodiment of an autotransformer of the ATRU of FIG. 1.

A second embodiment of the autotransformer 8 is illustrated in FIG. 4. This embodiment which differs from that of FIG. 2 in that the predetermined point is the neutral point A.

Furthermore, unlike the first embodiment illustrated in FIG. 2, in this second embodiment, the first auxiliary output $S_{A1,i}$, is connected to the terminal $H_i$ via a winding $B_{10,i}$ of the winding group i. Furthermore, the third auxiliary output $S_{A3,i}$, is connected to the terminal $L_i$ via a winding $B_{11,i-1}$ of the winding group i−1.

The winding $B_{10,i}$ is oriented in the negative direction, while the winding $B_{11,i-1}$ is oriented in the positive direction.

In this case, as is apparent from this figure, the voltage between each output and the neutral point A belongs, on the Fresnel diagram, to a circle centered on the neutral point A.

As a result, the voltages between each output and the neutral point are distinct and two by two out of phase with each other by an integer multiple of 24°.

Figure 5:
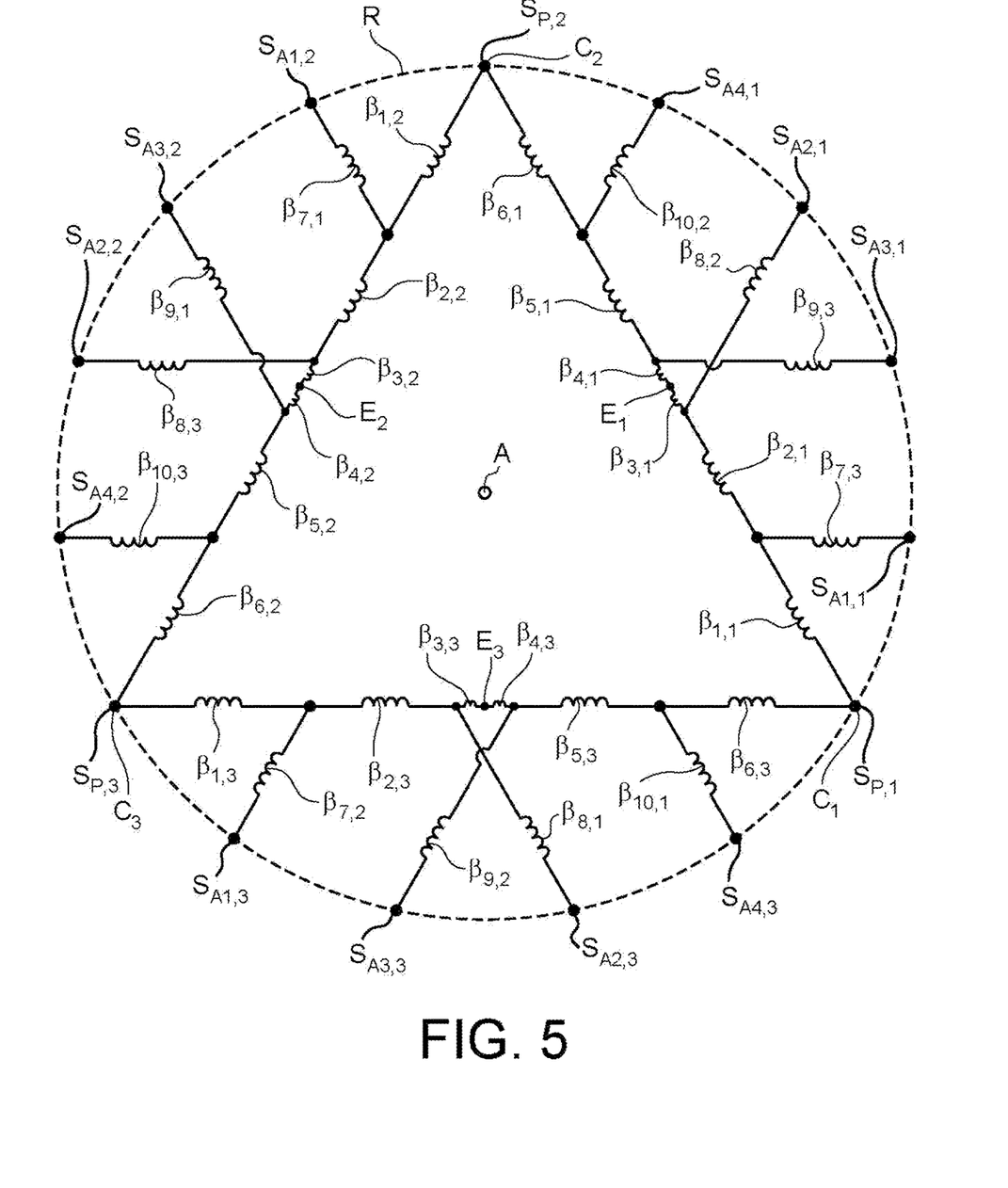
FIG. 5 is a Fresnel diagram illustrating voltages involved in a third embodiment of an autotransformer of the ATRU of FIG. 1.

A third embodiment of the autotransformer 8 is illustrated in FIG. 5. As in the second embodiment illustrated in FIG. 4, the predetermined point here is the neutral point A.

In this third embodiment, the autotransformer 8 comprises three connection points $C_1$, $C_2$ and $C_3$.

The winding group i (i being 1, 2 or 3) includes, between the connection point $C_i$ and the connection point $C_{i+1}$, six windings $\beta_{1,i}$ to $\beta_{6,i}$ in series. The windings $\beta_{1,i}$ to $\beta_{6,i}$ are oriented in the positive direction.

Preferably, the windings $\beta_{1,i}$ and $\beta_{6,i}$ are identical. Even more preferably, the windings $\beta_{2,i}$ and $\beta_{5,i}$ are identical. Even more preferably, the windings $\beta_{3,i}$ and $\beta_{4,i}$ are identical.

In this case, the input $E_i$ (i taking all values from 1 to 3) of the autotransformer 8 is connected to a connection point between the windings $\beta_{3,i}$ and $\beta_{4,i}$.

The main output $S_{P,i}$ of the output group i is electrically connected to the connection point Ci.

The first auxiliary output $S_{A1,i}$ of the output group i is electrically connected to a connection point between the windings $\beta_{1,i}$ and $\beta_{2,i}$ via a winding $\beta_{7,i-1}$ of the winding group i−1, oriented in the positive direction.

The second auxiliary output $S_{A2,i}$ of the output group i is electrically connected to a connection point between the windings $\beta_{2,i}$ and $\beta_{3,i}$ via a winding $\beta_{8,i+1}$ of the winding group i+1, oriented in the negative direction.

The third auxiliary output $S_{A1,i}$ of the output group i is electrically connected to a connection point between the windings $\beta_{4,i}$ and $\beta_{5,i}$ via a winding $\beta_{9,i-1}$ of the winding group i−1, oriented in the positive direction.

The fourth auxiliary output $S_{A4,i}$ of the output group i is electrically connected to a connection point between the windings $\beta_{5,i}$ and $\beta_{6,i}$ via a winding $\beta_{10,i+1}$ of the winding group i+1, oriented in the negative direction.

The windings described above are configured so that, when the autotransformer 8 is connected to a balanced electrical grid 4, voltages between each output and the neutral point are distinct, of the same amplitude, and two by two out of phase with each other by an integer multiple of 24°.

The connection of the electrical piece of equipment 2 to the electrical grid 4 by means of the ATRU 6 will now be described.

As previously indicated, the electrical piece of equipment 2 is dimensioned to have, as an input, a predetermined nominal input voltage, typically equal to $6\sqrt{6}/\pi$ times the input voltage supplied by the electrical grid 4. For example, for a 115 V AC electrical grid, the electrical piece of equipment 2 is dimensioned to have, as an input, a nominal input voltage approximately equal to 540 V.

The ATRU 6 is dimensioned so that, for a given input amplitude imposed by the electrical grid 4, the main output voltage of the autotransformer 8 has an amplitude equal to the product of the input amplitude by the predetermined coefficient.

Each phase of the electrical grid 4 is connected to a corresponding input of the ATRU 6. In addition, the outputs $S_1$, $S_2$ of the ATRU 6 are connected to the electrical piece of equipment 2.

In operation, the autotransformer 8 delivers fifteen voltages to the rectifier stage 10. Of these voltages, the main output voltage at the main output of each output group of the autotransformer 8 has an amplitude equal to the product of the input amplitude by the predetermined coefficient.

The uncontrolled rectifier stage 10 rectifies the fifteen voltages applied to its inputs ER into a DC voltage equal to approximately 1.4 times the phase-to-phase input effective voltage.

What is claimed is:

1. A three-phase autotransformer including three inputs, three output groups and a plurality of windings distributed into three winding groups, the windings of a same winding group being magnetically coupled to each other, each winding group being associated with a respective phase, wherein
   each output group comprises five outputs comprising a main output and four auxiliary outputs,
   each input being associated with each of the outputs of a corresponding output group,
   each input being connected to each of the corresponding outputs through a respective electrical path comprising at least one winding, and
   for each input, the electrical path between said input and a corresponding output on the one hand, and the electrical path between the input and any other output of the same output group on the other hand, comprise at least one distinct winding,
   the windings being configured so that, when each input has a respective input voltage applied thereto, the three input voltages having the same input amplitude, being 120° out of phase with each other and defining a neutral point:
   for each output group, a main output voltage, taken equal to a voltage between the corresponding main output and the neutral point, has an amplitude, forming a main output amplitude, greater than the input amplitude; and
   all output voltages of the autotransformer belong to a same Reuleaux polygon in a Fresnel diagram, each output voltage being associated with a respective output and being equal to a voltage between said output and the neutral point.

2. The autotransformer according to claim 1, wherein the windings are configured such that, when each input has a respective input voltage applied thereto, the three input voltages having the same input amplitude, being 120° out of phase with each other and defining a neutral point:
   the three main output voltages are 120° out of phase with each other; and
   for a given distinct first main output and second main output of the main outputs, and for each of the auxiliary outputs for which a corresponding auxiliary voltage, equal to the voltage between said auxiliary output and the neutral point, has a phase between the phase of the main output voltage of the first main output and the phase of the main output voltage of the second main output, the voltages between said outputs and a predetermined point have the same amplitude.

3. The autotransformer according to claim 2, wherein the predetermined point is a third main output distinct from the first main output and the second main output.

4. The autotransformer according to claim 2, wherein the predetermined point is the neutral point.

5. The autotransformer according to claim 4, wherein the voltages between each output and the neutral point are distinct and two by two out of phase with each other by an integer multiple of 24°.

6. The autotransformer according to claim 1, wherein each main output amplitude is equal to the product of the input amplitude by a predetermined coefficient between 1.85 and 2, preferably between 1.9 and 1.95, for example equal to 1.93.

7. The autotransformer according to claim 1, wherein, for the first main output, the second main output, and each of the auxiliary outputs for which the corresponding auxiliary voltage has a phase between the phase of the main output voltage of the first main output and the phase of the main output voltage of the second main output, the voltages between said outputs and the third main output are distinct and two by two out of phase with each other by an integer multiple of 12°.

8. The autotransformer according to claim 1, wherein the electrical path between an input and any output of the corresponding output group includes at least two windings each belonging to different winding groups.

9. An autotransformer-rectifier unit comprising an autotransformer according to claim 1 and a rectifier stage, the rectifier stage comprising fifteen inputs and two outputs, each input of the rectifier stage being connected to a respective output of the autotransformer.

10. A method for connecting an electrical piece of equipment to a three-phase grid by an autotransformer-rectifier unit according to claim 9, the electrical piece of equipment being dimensioned to have, as an input, a predetermined nominal voltage, the three-phase grid delivering three voltages each having a corresponding input amplitude, the method including the steps of:
- connecting each input of the autotransformer to a corresponding phase of the three-phase grid; and
- connecting the electrical piece of equipment between the two outputs of the rectifier stage, the predetermined nominal voltage being equal to $6\sqrt{6}/\pi$ times the input voltage.

\* \* \* \* \*